E. H. CURTIS, Jr.
CONVEYER.
APPLICATION FILED MAR. 28, 1917.
1,263,043.
Patented Apr. 16, 1918.
2 SHEETS—SHEET 1.
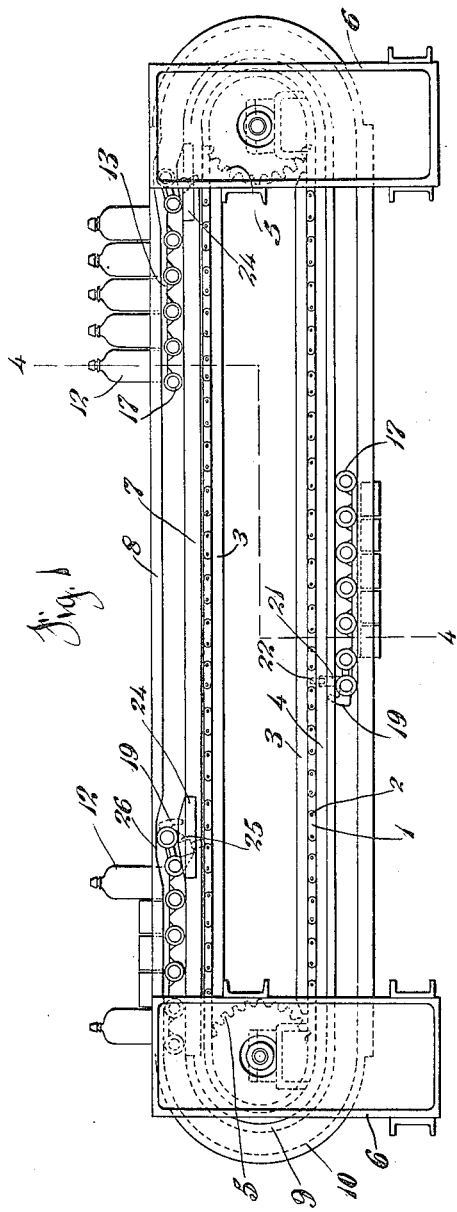
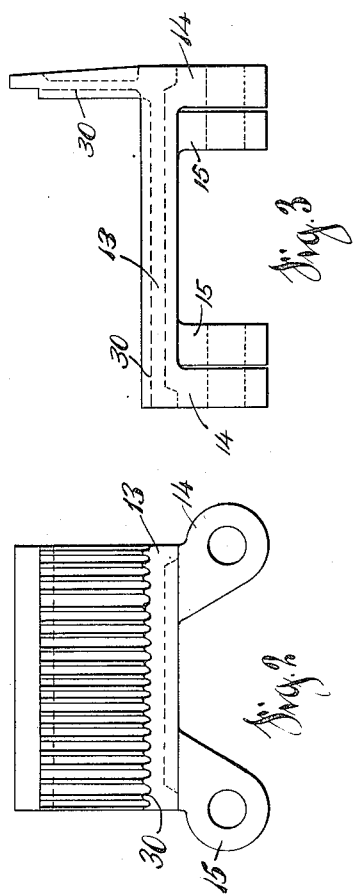

UNITED STATES PATENT OFFICE.

EDMA H. CURTIS, JR., OF NORWOOD, OHIO, ASSIGNOR TO THE NIVISON-WEISKOPF COMPANY, OF READING, OHIO, A CORPORATION OF OHIO.

CONVEYER.

1,263,043.

Specification of Letters Patent. Patented Apr. 16, 1918.

Application filed March 28, 1917. Serial No. 157,886.

*To all whom it may concern:*

Be it known that I, EDMA H. CURTIS, Jr., a citizen of the United States, and a resident of Norwood, in the county of Hamilton and State of Ohio, have invented certain new and useful Improvements in Conveyers, of which the following is a full, clear, and exact description, reference being had to the accompanying drawings, forming part of this specification.

My invention relates to conveyers for moving work from one place to another. The particular object in view, in the invention, is to provide a conveyer which adapts itself to the carrying of hollow glassware articles in a glass factory, although, as will be pointed out hereafter, there is no intention that this be the only use of the machine, since it will adapt itself to many uses which should not require particular discussion.

In the manufacture of hollow glassware such as bottles and the like, the usual practice is to complete the blowing of the bottles one at a time, and thus to require their removal one by one from the blowing apparatus either by hand or automatically. When the bottles are blown to the desired shape, they are then annealed for a period of some hours in an oven, and it is not good practice to place the blown bottle immediately in the oven after leaving the blow mold, because of the likelihood of running, since it is still in a more or less fluid condition.

If a man is employed to carry off from a blowing machine and place the bottles in the annealer, he must give them time to cool and harden slightly before picking them up. Also, of course, he must walk with them from the blowing machine to the furnace, which consumes time. Thus it is that one man is needed for carrying off from each blowing machine, as well as a man to pick the bottles out of the machines when they are completed. During the time that the carrying-off boy walks to the furnace and back, the bottles for his next load must be picked out and placed ready for him and must have stood sufficient time to harden.
The particular object of my invention is to provide a conveyer for this particular kind of work, which, it can be seen, requires a carrier mechanism which will adequately receive and hold the bottles and will move slowly and without jerks. It requires a carrier that will stop at a station near the blowing machine so that it can receive a stock of bottles, one at a time, before it moves on again. If it did not do this, there would have to be a conveying of one bottle at a time and a carrying off from the conveyer of one bottle at a time, whereas if a half dozen or more bottles can be lifted off the conveyer at one time, a single man can attend to several conveyers, and also the bottles if sent one at a time would probably be in too fluid a condition for the annealer. In the device herein the carriers stop before the annealer, although they might pass into it directly. Then again it requires a structure capable of timing, so that the carriers will stop at the stations a sufficient length of time and move slowly from the blower to the annealer, although the distance from the blowing machines to the annealer be different for the several conveyers that are to be attended to by one man. As before stated, it is not desirable nor practical to have conveyers run at excessive speeds, since not only will the bottles reach the end of the conveyer in too fluid a condition if the conveyers turn rapidly, but also the bottles are likely to jerk off the carriers when they come to a stop.

Thus the particular object of the invention herein is to provide for these various requisites in the carrying off of bottles. I provide for a track mechanism for supporting the desired number of trains, each train operated by a puller located at the front thereof. The pullers are operated by contact pins which are moved continuously over the bed of the machine, at the desired frequency, and the stopping stations are provided by means of slight inclines arranged to throw out of connection the contact pins. It is my general theory of operation that the trains shall stop at the stations until displaced by a succeeding train, and that to vary the frequency of the trains without speeding up the movement of the contact pins should be done by increasing or decreasing the number of pins and trains. By this means I have discovered that I can run say three conveyers for each carry-off man, have each conveyer a different length from the others, deliver bottles to the conveyers at the same rate, have all moving parts running at the same rate, and yet deliver the bottles to the carry-off man in a regular series, *i. e.* the first conveyer to deliver the first batch, the second conveyer the second batch, the third the third batch, and then back to the first conveyer, so that the man can carry off from all three without difficulty.
As before stated, however, I do not wish to be limited to the particular use, now generally pointed out, but intend that my device be used for any purpose for which it may be convenient. Thus it can be used for carrying work from one operator to another, where it is not convenient to remove work from the conveyer and place it back on again for each operation thereon. It can be used for carrying off from other sorts of machines where a batch of goods is to be delivered, but must be placed one at a time on the conveyer. There may be many other uses and I do not consider it necessary to point out all of them that occur to me, since it is my intention that all uses possible, together with all non-essential modifications necessary to adapt the machine to the uses should be considered as within the scope of my invention.
Thus while two stations have so far been spoken of and only two are shown in the drawings, it will be understood that any desired number of stations can readily be provided for, so far as the essential principles of the invention are concerned, or that any number of carriers should stop at a station.

The above objects and advantages now briefly noted and roughly described, will be hereinafter more specifically pointed out, the structure whereby they are accomplished in this exemplification of the invention will be specifically described, and the novelty of the invention set forth in the appended claims.

In the drawings,

Figure 1 is a side elevation of the device.

Fig. 2 is a side elevation on a larger scale of one of the train units.
Fig. 3 is an end elevation of one of said units.

Figure 4:
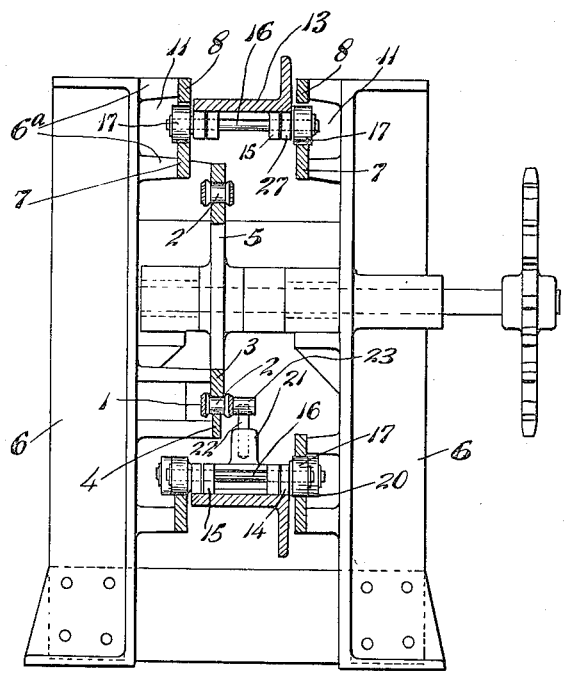
Fig. 4 is a vertical section of the device taken on the line 4, 4, of Fig. 1, with a section of the last car of a train shown on the upper track. This view is taken looking to the left.
Figure 5:
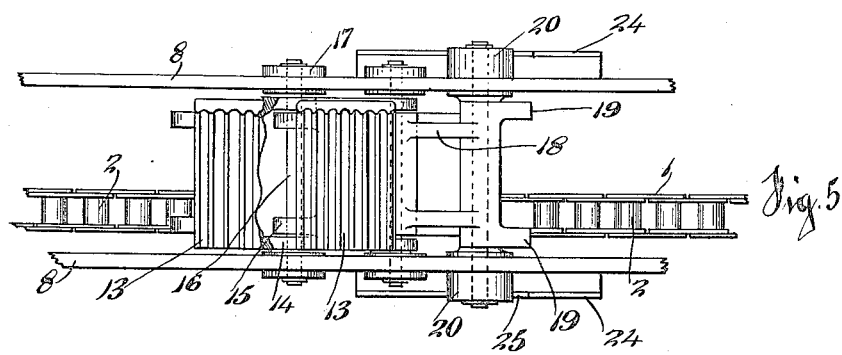
Fig. 5 is a top plan view, partly broken away, of one of the pullers and the end of a train, at a stopping point.
Figure 6:
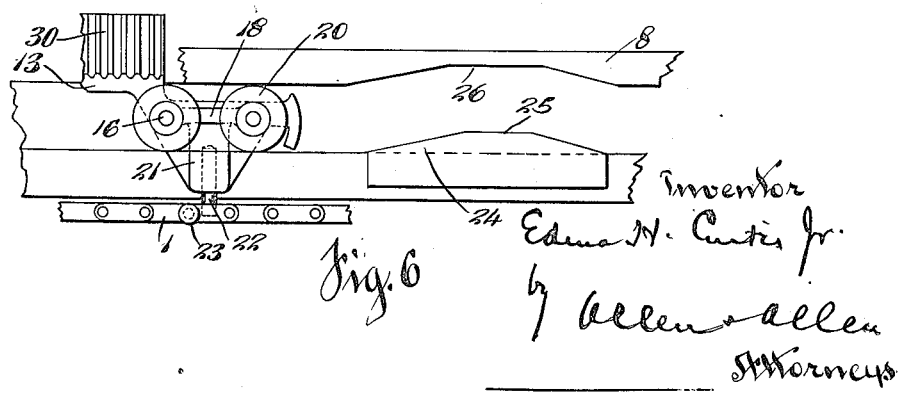
Fig. 6 is a side elevation of the same parts showing the puller approaching the stopping point.

The operating chain of the exemplification of my invention shown in the drawings comprises links 1, 1, held together by rollers 2, 2. The rollers ride between the edges of an inner plate or web 3 and an outer plate or web 4. These plates extend the length of the device except at the ends thereof, where there are sprockets 5, 5, which engage the links and feed the chain. One only of the sprockets is driven and the chain will not be slack at any point because it is held by the plates or webs above referred to, which webs also prevent lateral movement of the chain, since they are straddled by the links thereof.

The plates or webs are held at each end by standards 6 which support the sprockets, and extending across between the standards and supported on brackets 6ª thereon, are interspaced track members 7, 8. The tracks 7 are the inner and the tracks 8 the outer members and they pass entirely around the machine, since around the sprockets they are supplemented by like members 9, 10, except that they are curved. It will also be noted that there is a space 11 between the brackets.

There are shown in the drawings three trains for the carrying of the bottles 12. While the trains are made up of separate members hinged together so that they will pass around the curved portions 9, 10 of the tracks, it will be understood that some other sort of flexible device could as well be provided.

The trains are made up of small plates 13 of metal having preferably an angle shape above and having lugs depending below. At the forward end of each plate there are lugs 14, 14, and at the rear end of each plate there are lugs 15, 15, spaced less widely apart. When the trains are assembled, an axle or pin 16 is passed between the lugs, which owing to the varying width of separation will overlap each other, and on the ends of the axles are mounted wheels or rollers 17. The rollers fit the tracks and need not be flanged. They do not ordinarily contact with the upper track members, which said members are mainly for safety to prevent the plates or units of the trains from rising off the lower track. It will of course be understood that the outer track is the lower on the bottom of the machine and vice versa on the upper side of the machine where the carrying is done.

While rollers are described as carrying the train units, it will be understood that some other means could as well be used which would be held and guided around the machine without excessive friction.

For moving the trains by means of the chains, there is provided a puller for each train. This consists in a metal piece 18 which has at its forward end two rounded fingers or bumpers 19. It has roller mounting means like the train units, and in the forward ones there are wide rollers 20 which in passing around the machine rest on the tracks and also extend outwardly from them. The space 11 between the brackets gives these wide rollers clearance in passing the standards.

Extending inwardly, beyond the periphery of the train rollers, on each of the pullers, is a boss 21 which carries a contact pin 22. The chain has a pin 23 extending laterally from one of its links which contacts with the pin 22, and causes the puller to be moved along with the chain. It will be developed below, that with the use of larger numbers of trains and pullers, there will be used a larger number of chain pins, so that the device can be arranged for a wide variation of duties.

At each station where it is desired to have the trains come to a stop for receiving or discharging the load, there are mounted on the outside of the two inner or lower tracks the inclined plates 24, 24. These plates will engage only the wide rollers on the pullers, and will not interfere with the train units. They have a level space 25 at their central part, and the upper track members adjacent the inclined plates are cut away at 26 so as to give clearance to the wide rollers when they pass up on the inclines.

As a train approaches the station, the wide rollers of the puller pass up on the incline. As they reach the level portion thereof the contact pin comes out of driving relation with the pin on the chain, and the puller and train come to a stop releasing the chain pin so that the continuous running of the chain is not interfered with. The puller will remain in the above position until the next train behind it comes along and pushes it down on the track again so that its contact pin lies in the path of the chain pin again.

Taking the parts in the position with one train at delivery station and one at receiving station, and one lying idle at the under side of the device: As the chain pin comes in contact with the puller on the under train, it draws the train along, up over the sprocket and brings the bumper fingers against the rear unit of the train. The lugs on this rear unit are set closer together than the forward lugs, as above explained, which necessitates the mounting between the lugs at the rear of the rear unit and the rollers on the axle thereof, of idlers 27, and it is with these idlers that the bumper fingers will contact.

The bumpers push the train lying at the receiving station forward so that the puller front rollers ride down onto the track again off the incline, and the puller on the moving train comes into position where its puller is released from the chain drive. The chain pin thus released moves forward with the chain until it picks up the puller on the train now released, and carries the released train forward until it displaces the train at the next station (the delivery station in this instance).

The train released at the delivery station in the example selected herein, then runs idly around the curved portion of the track over the sprocket and then runs idly along the underneath portion of the track until it is picked up by the chain pin, then freed from the displacing train.

If there were four trains on the track and two chain pins spaced apart half the distance of the chain, then the device would be started with three trains in sight above and one train moving below. This train would displace the first train and in the meantime the fourth train lying between stations above would be moving under impulse of the second chain pin. The trains at the two stations would not be displaced simultaneously, as the discharging train would move first. As there would thus be one train moving below and one above, with intermediate waits at the stations of each train, it can be seen that the length of stop of the trains at the stations and the frequency of trains can in this way be easily arranged for.

The speeding up of the movement of the chain would accomplish a like purpose, but it can be seen that this is necessarily limited in scope due to the nature of the work, and the necessity of an easy operation of the trains. It can also be appreciated that there could be more than two stations.

The operating device can work continuously and there is no necessity of shifting belts, or gears, starting and stopping motors or the like, which would otherwise be required for the proper interrupted movement of the conveyer trains.

It should be noted that for use in a glass factory, the train units are specially designed. In such practice the bottles or other ware must not contact with cold metal or they will check due to too rapid chilling. Thus the supporting bases for the glass and the side flanges in the train units herein, are cut with sharp transverse corrugations 30, which has been found to practically do away with the danger of checking in the transportation of a hot piece of glassware from a blowing machine.

It should be understood that the device shown and described above is merely an exemplification of my invention, and that it is not intended to be implied that other equivalent devices could not well be employed to accomplish like movements, controls and interruptions, which, as above stated, constitute the essential features of my invention.

It can be seen that by the extension of the level space on the inclines, such number of carriers as may be desired could be stopped and pushed off one at a time, or the track for the trains could extend farther than the chain sprockets, which would provide a terminal station for the desired number of carriers. The carriers when they pass over the return bend of the tracks, would run free for enough space to catch up with the chain pin. If desired, the stations could be provided for by a dip in the chain, which it is plain would accomplish the same object.

By the utilization of some such device my conveyer could be used for delivery direct to the annealer or leer, and it should be understood that in speaking of displacement of one train by another in the claims that follow it is not meant that the displaced train should be the one immediately preceding the displacing train.

Having thus described my invention, what I claim as new and desire to secure by Letters Patent, is:—

1. In a conveyer, a plurality of traveling members, an endless support therefor, said members being adapted to travel around said support, means for stopping the traveling members at desired points, and means whereby the traveling members upon arriving at a stopping point will displace a member already there and cause it to resume travel.

2. In a conveyer, the combination with an endless supporting frame, a plurality of trains comprising hinged together members, said trains adapted to pass around the said frame, a movable member passing around said frame, each of said trains having means lying in the path of said movable member, and elevating means for lifting the said means out of said path at desired points.

3. In a conveyer, the combination with an endless supporting frame, a plurality of trains comprising hinged together members, said trains adapted to pass around the said frame, a movable member passing around said frame, each of said trains having contact means lying in the path of said movable member, and elevating means for lifting the said contact means out of said path at desired points, said elevating means being adapted to release said means upon contact of another train, from the rear.

4. In a conveyer, an endless track, traveling carriers upon said track, a puller for each of said carriers, a movable member passing around with said track, said pullers having means lying in the path of the movable member, a raised portion adjacent said track at desired points, said pullers being adapted to engage said raised portions and the carriers not to do so, said raised portions being adapted to bring the puller means out of the path of the movable member, and to release said pullers upon thrust from behind, as and for the purpose described.

5. In a conveyer, an endless track, carriers thereon, said carriers comprising metallic members hinged together, with roller means on the hinged connection member and said roller means adapted to ride on the track, a puller for each carrier having wide rollers adapted to ride on said track and extend laterally therefrom, and plates set at desired stations along the track to engage the wide rollers and lift them upwardly, and upon further movement to let them back onto the said track, and an operating means adapted to engage the pullers except when so lifted upwardly.

6. In a conveyer, a pair of endless upper and lower tracks, trains comprising roller supported members flexibly secured together, and adapted to ride between said tracks, and automatic starting and stopping means for said trains adapted to stop them at desired stations and start them moving, substantially as described.

7. In a conveyer for glass, a carrier to receive said glass from the blower, comprising a metallic portion with which said glass is to contact, said portion being finely corrugated, for the purpose described.

8. A movable carrier for conveying glass bottles, comprising a succession of carrier units connected together, comprising metallic angle plates having the vertical wall and the seat portion finely corrugated, for the purpose described.

9. A movable carrier for conveying glassware from the blower to the annealer, comprising in part an angle shaped metallic piece having both interior walls of the angle finely corrugated, for the purpose described.

10. In a conveyer, an endless support, carrier elements adapted to move around said support, a plurality of stopping points for said carrier elements, means for moving said carrier elements, stopping them at each station and returning them around said support, said moving and stopping being subject to variations of frequency of arrival of carrier elements at the stations without speeding up the movement of the moving means.

EDMA H. CURTIS, Jr.